United States Patent
Wojtech

[11] Patent Number: 6,041,580
[45] Date of Patent: Mar. 28, 2000

[54] CRIMPING JAW ASSEMBLIES FOR FORMING PACKAGE CLOSURES

[75] Inventor: Theodore M. Wojtech, Red Bank, N.J.

[73] Assignee: Greener Corp., Beachwood, N.J.

[21] Appl. No.: 09/124,580

[22] Filed: Jul. 29, 1998

[51] Int. Cl.[7] .............................. B65B 9/06; B65B 51/12; B65B 51/26

[52] U.S. Cl. .................... 53/551; 53/371.2; 53/371.4; 53/372.4; 53/374.2; 53/375.4

[58] Field of Search .................. 53/550, 371.2, 53/371.4, 374.2, 374.4, 372.4, 372.6, 375.4, 375.6, 551

[56] References Cited

U.S. PATENT DOCUMENTS

| | | | |
|---|---|---|---|
| 3,236,714 | 2/1966 | Traut | 53/374.1 |
| 3,243,487 | 3/1966 | Smith | 53/374.1 |
| 3,409,494 | 11/1968 | Korizinek | 53/374.4 |
| 3,508,378 | 4/1970 | Fehr et al. | 53/371.3 |
| 3,551,259 | 12/1970 | Swarzkoph | 53/371.4 |
| 3,943,686 | 3/1976 | Crawford et al. . | |
| 3,982,991 | 9/1976 | Hamm et al. | 53/39 |
| 4,254,601 | 3/1981 | Prager et al. . | |
| 4,455,808 | 6/1984 | Netzhammer . | |
| 4,693,058 | 9/1987 | Kovacs | 53/371.4 |
| 4,807,426 | 2/1989 | Smith | 53/583.1 |
| 5,247,779 | 9/1993 | Wirsig et al. | 53/374.2 |
| 5,451,288 | 9/1995 | Smith et al. . | |
| 5,537,804 | 7/1996 | Tolson | 53/374.8 |
| 5,868,901 | 2/1999 | Smith . | |

*Primary Examiner*—John Sipos
*Attorney, Agent, or Firm*—Arthur Jacob

[57] ABSTRACT

An improvement in a package closure crimping apparatus in which opposed crimping jaws are moved in crimping directions toward and away from one another to exert crimping forces for forming a sealed closure in a package constructed of thin film material having a given film thickness and placed between the crimping jaws, the sealed closures extending along a prescribed length between opposite package edges, includes a crimping jaw carrier for movement along the crimping directions, a crimping jaw carried by the crimping jaw carrier for movement with the crimping jaw carrier, the crimping jaw having a jaw length extending along the prescribed length, and a cushion of resilient material interposed between the crimping jaw and the crimping jaw carrier, along the prescribed length, for facilitating distribution of the crimping forces along the jaw length of the crimping jaw.

18 Claims, 7 Drawing Sheets

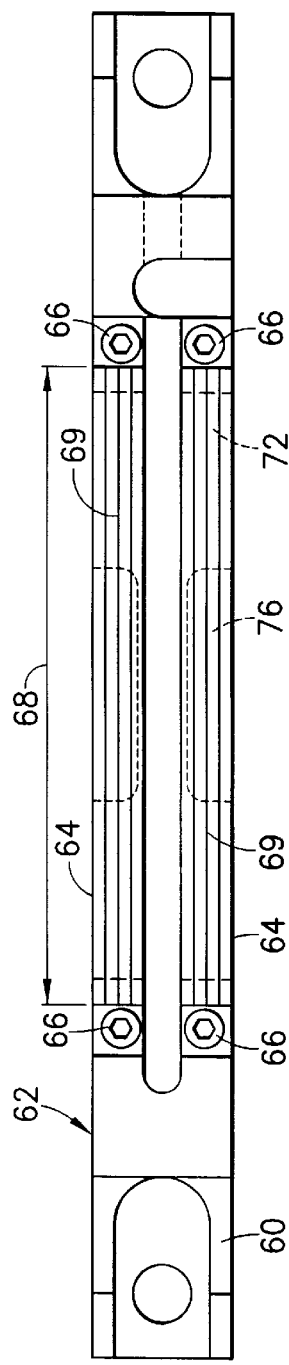
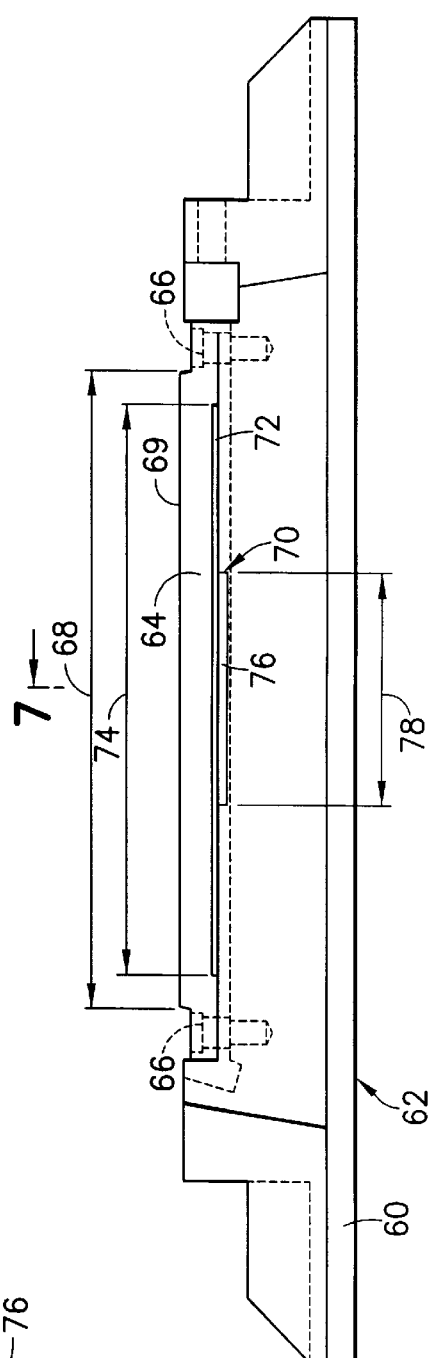
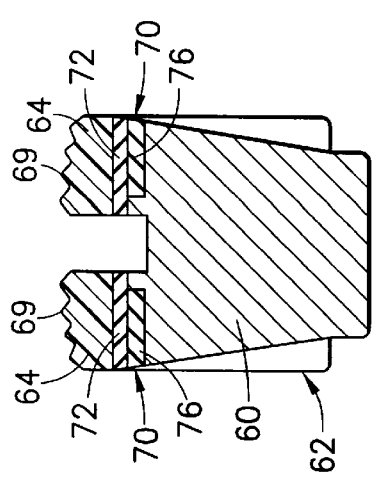

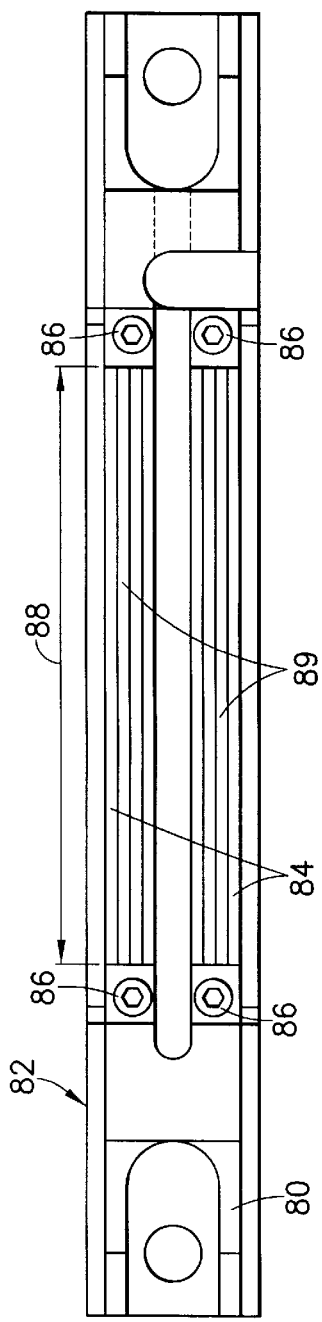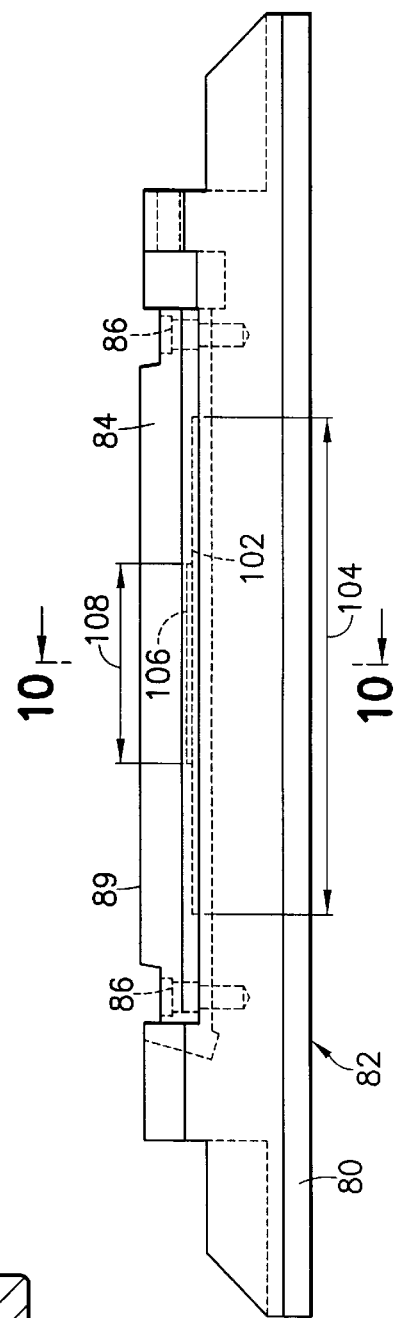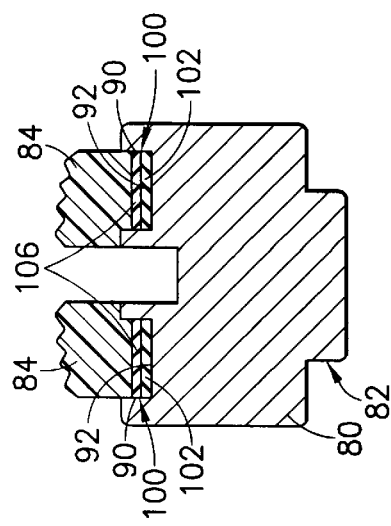

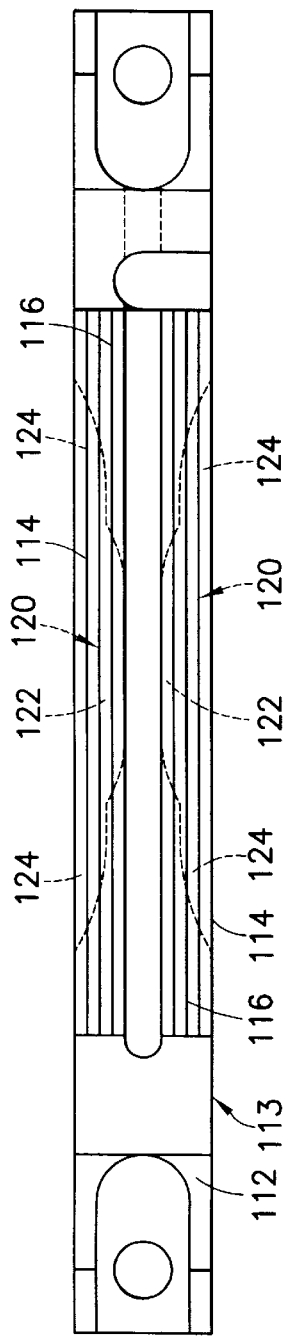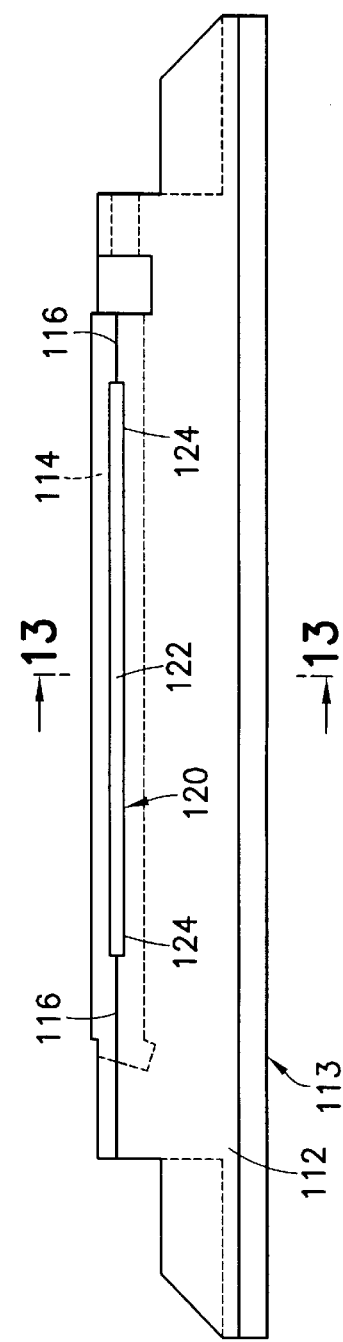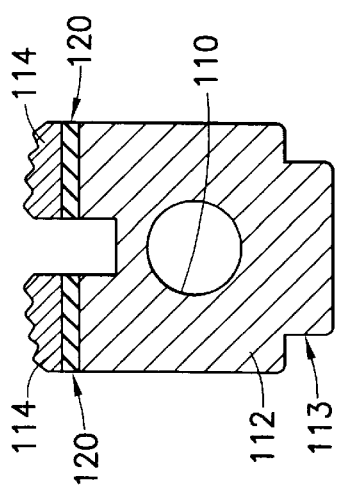

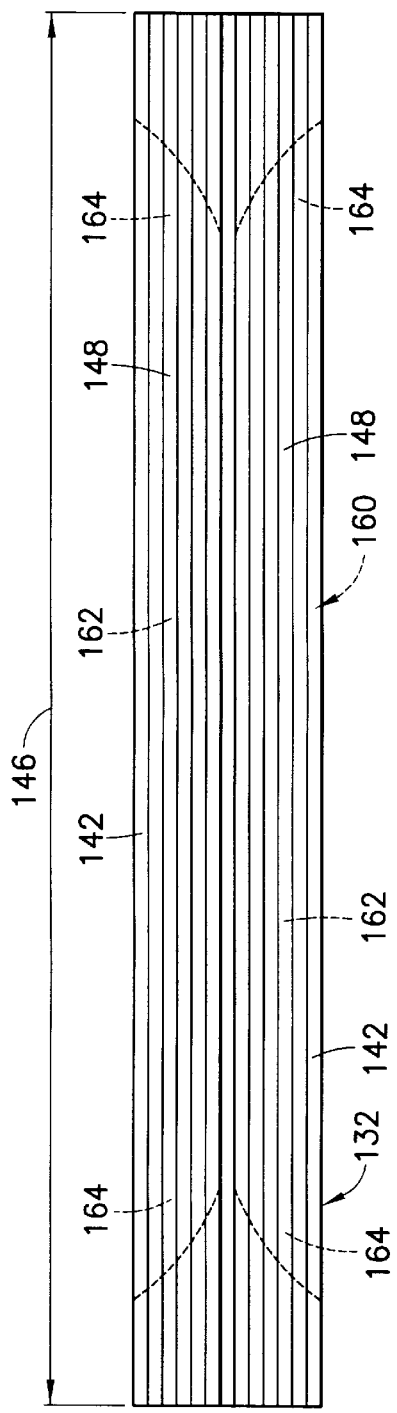
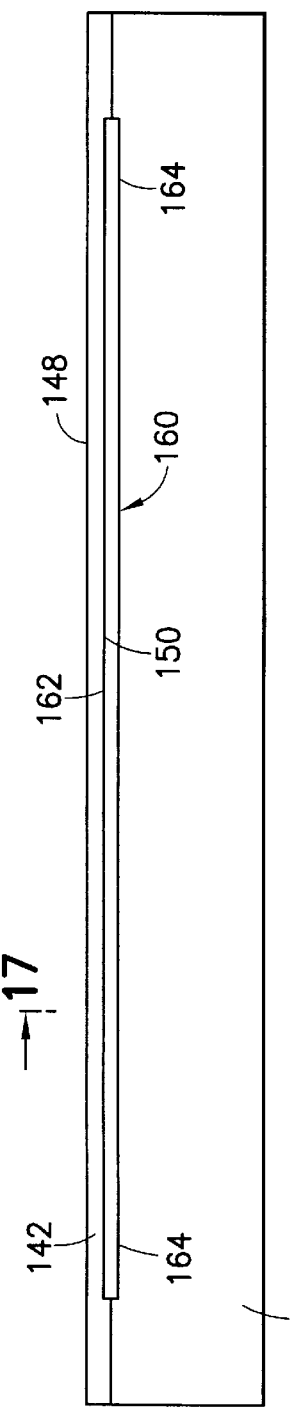
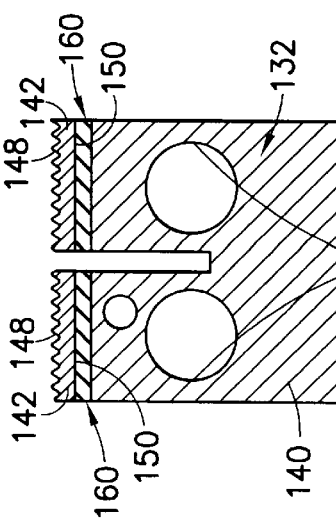

CRIMPING JAW ASSEMBLIES FOR FORMING PACKAGE CLOSURES

The present invention relates generally to apparatus for forming package closures and pertains, more specifically, to crimping jaw assemblies in which opposed crimping jaws are moved toward one another to establish a sealed closure in a package constructed of thin film material placed between the opposed jaws.

A wide variety of apparatus currently is available for effecting the closing and sealing of bags and bag-like packages constructed of thin film materials. In some of these packages, closing and sealing is accomplished by heat-sealing arrangements in which opposed, heated crimping jaws are urged together to form a closure in packaging materials placed between the opposed crimping jaws. In other packages, a closure is formed by opposed crimping jaws urged together to join interposed packaging materials utilizing an adhesive to form a cohesive closure. Whether a closure is established by heat sealing or by cohesive sealing, it is advantageous to provide essentially uniform crimping forces along the length of the closure so as to assure that an appropriate seal is established throughout the extent of the closure, without excessive forces which could tend to rupture the material of the package and thus defeat the desired seal. At the same time, it is desirable to maintain accuracy in the relationship between the opposed crimping jaws, while minimizing the deleterious effects of wear.

Difficulties arise in maintaining uniform crimping forces along the full length of a package closure, with accuracy and minimum wear along the crimping jaws, especially in closing packages which have a non-uniform thickness along the length of the closure. Thus, in those packages which include a fin area, that is, an area wherein seamed layers of film which make up the package present multiple thicknesses of film in a limited portion of the length of the closure, crimping forces can rise to excessive levels, resulting in uneven seals and even rupture of the film, with concomitant defective closures.

The present invention provides improvements in the crimping jaws of crimping jaw assemblies utilized in package closure crimping apparatus, which improvements address the problems outlined above. As such, the present invention attains several objects and advantages, some of which are summarized as follows: Attains a more even seal of desired uniform high integrity along the full length of a closure formed in a package constructed of thin film material; reduces wear along the crimping jaws of package closure apparatus and thereby increases accuracy and longevity; assures a more even distribution of crimping forces along the length of the crimping jaws of a crimping jaw assembly in package closure apparatus, with a concomitant reduction in deleterious wear and increased accuracy in the establishment of an appropriately sealed closure; compensates more readily for variations in material thickness along the length of a package closure, and especially at the multiple thicknesses of material encountered at the fin area of a package constructed of a tubular member of thin film material; increases the effectiveness of crimping jaws utilized in connection with both heat-sealed package closures and cohesive sealed package closures; provides package closure crimping jaw assemblies with exemplary performance over an extended service life.

The above objects and advantages, as well as further objects and advantages, are attained by the present invention which may be described briefly as an improvement in a package closure crimping apparatus in which opposed crimping jaws are moved in crimping directions toward and away from one another to exert crimping forces for forming a sealed closure in a package constructed of thin film material having a given film thickness and placed between the crimping jaws, the sealed closures extending along a prescribed length between opposite package edges, the improvement comprising: a crimping jaw carrier for movement along the crimping directions; a crimping jaw carried by the crimping jaw carrier for movement with the crimping jaw carrier, the crimping jaw having a jaw length extending along the prescribed length; and a cushion of resilient material interposed between the crimping jaw and the crimping jaw carrier, along the prescribed length, for facilitating distribution of the crimping forces along the jaw length of the crimping jaw.

The invention will be understood more fully, while still further objects and advantages will become apparent, in the following detailed description of preferred embodiments of the invention illustrated in the accompanying drawing, in which:

FIG. 5 is a top plan view of a crimping jaw assembly incorporating an improvement of the present invention;

FIG. 6 is a front elevational view of the crimping jaw assembly of FIG. 5;

FIG. 7 is an enlarged cross-sectional view taken along line 7—7 of FIG. 6;

FIG. 8 is a top plan view of another crimping jaw assembly incorporating an improvement of the present invention;

FIG. 9 is a front elevational view of the crimping jaw assembly of FIG. 8;

FIG. 10 is an enlarged cross-sectional view taken along line 10—10 of FIG. 9;

FIG. 11 is a top plan view of still another crimping jaw assembly incorporating an improvement of the present invention;

FIG. 12 is a front elevational view of the crimping jaw assembly of FIG. 11;

FIG. 13 is an enlarged cross-sectional view taken along line 13—13 of FIG. 12;

FIG. 15 is a front elevational view of a crimping jaw assembly of the crimping jaw apparatus of FIG. 14;

FIG. 16 is a top plan view of the crimping jaw assembly of FIG. 15; and

FIG. 17 is an enlarged cross-sectional view taken along line 17—17 of FIG. 16.

Figure 1:
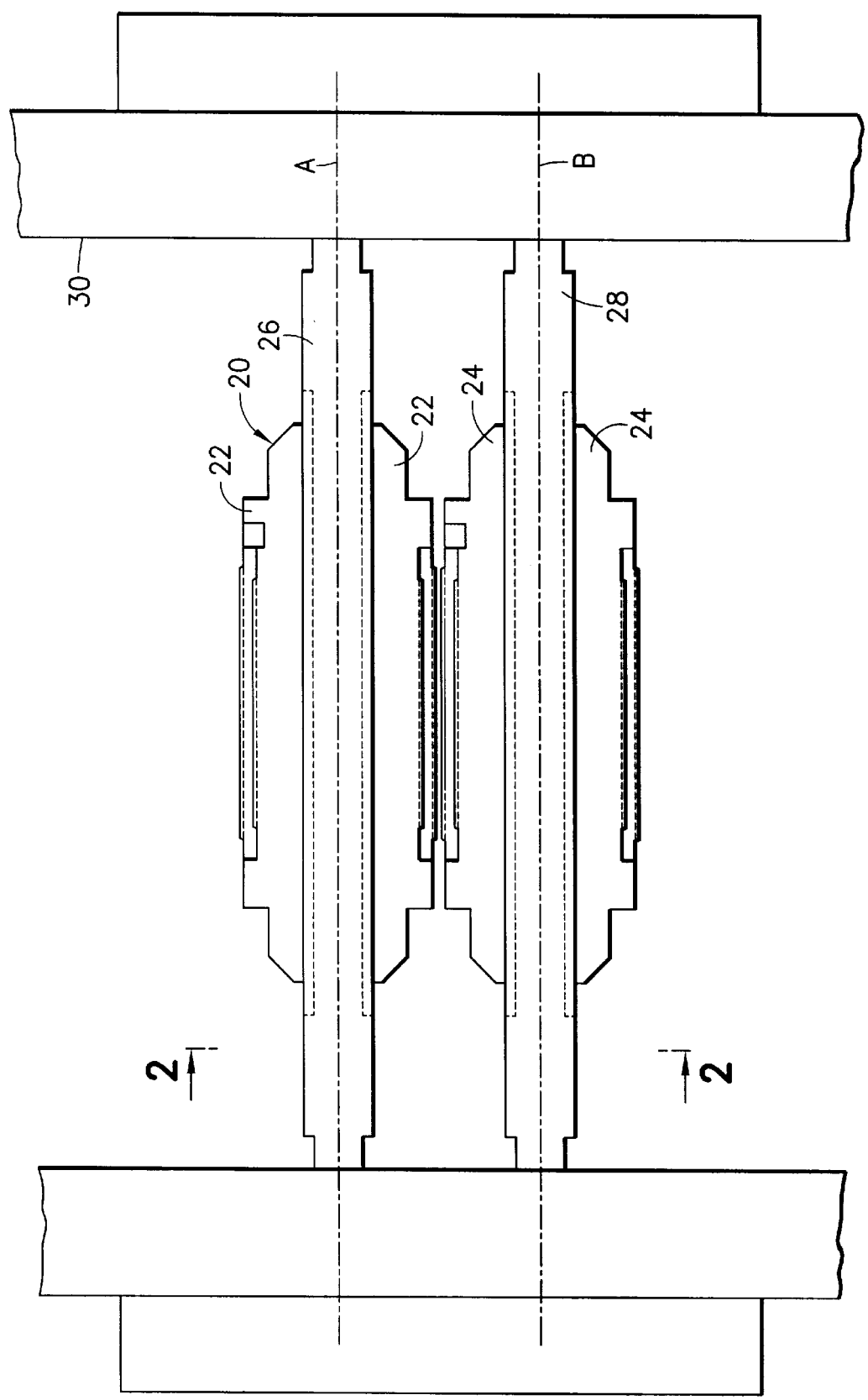
FIG. 1 is a front elevational view, partially diagrammatic, showing a package closure crimping apparatus with crimping jaw assemblies utilizing the improvement of the present invention.
Figure 2:
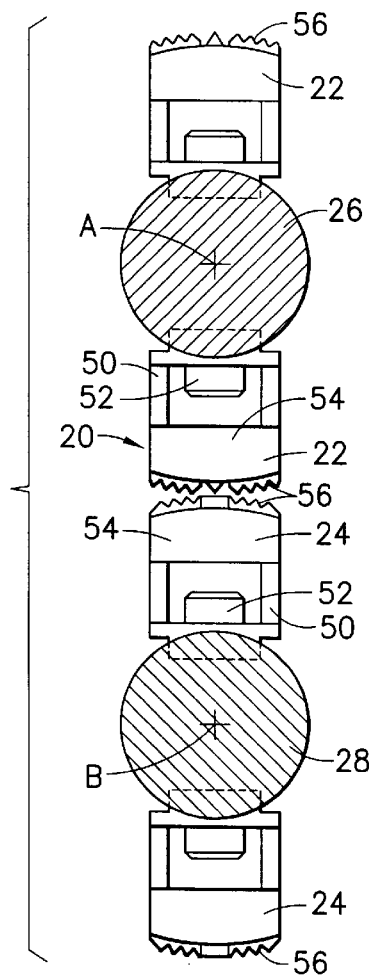
FIG. 2 is an enlarged cross-sectional view taken along line 2—2 of FIG. 1.
Figure 4:
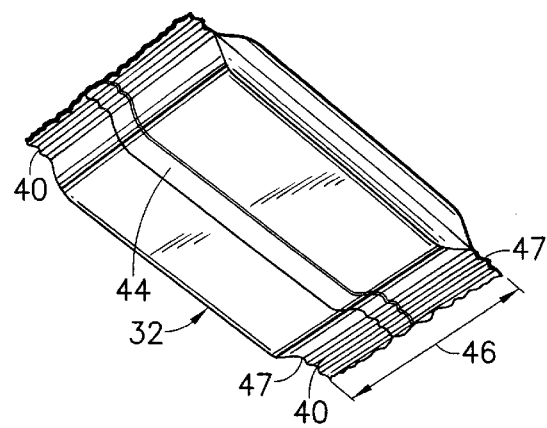
FIG. 4 is a pictorial bottom perspective view of a package of FIG. 3.
Figure 3:
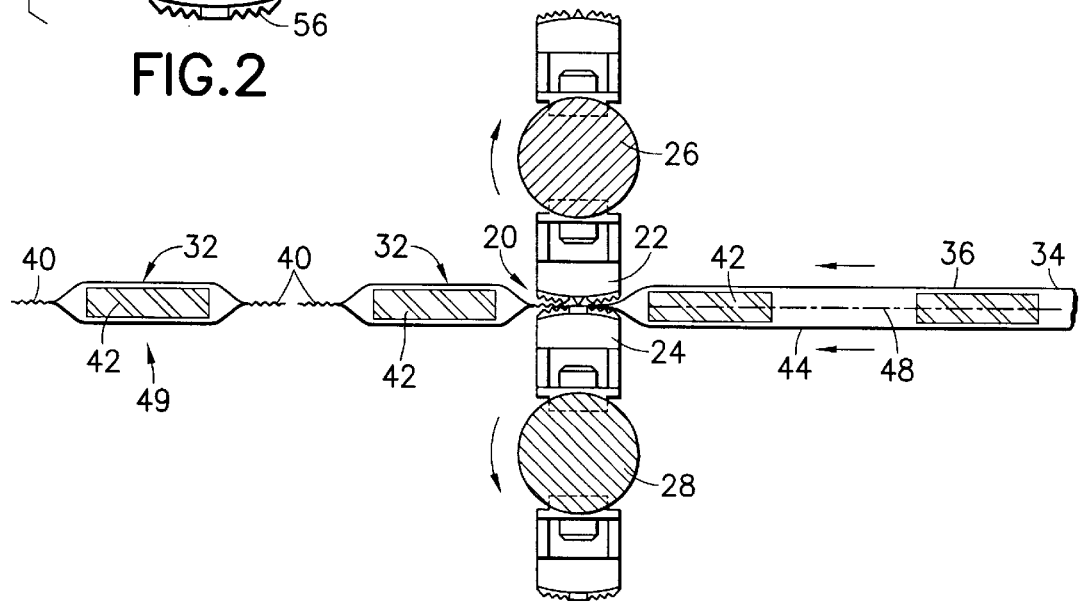
FIG. 3 is a cross-sectional view, somewhat similar to FIG. 2, and showing, diagrammatically, the operation of the crimping jaw assemblies in closing and sealing packages.

Referring now to the drawing, and especially to FIGS. 1 and 2 thereof, a package closure crimping apparatus 20 is seen to include sets of opposed upper and lower crimping jaw assemblies 22 and 24, respectively, mounted upon corresponding transverse shafts 26 and 28 jounaled for rotation about vertically spaced apart upper and lower axes of rotation A and B within a frame 30 of a machine for closing and sealing packages, all in a manner now conventional in package closing and sealing machines. In FIGS. 3 and 4, the packages being closed and sealed are shown as packages 32 constructed of a thin film material 34 which has been formed into a tubular member 36 of indeterminate length and which is sealed by the crimping apparatus 20 to form sealed closures 40 sealing contents 42 within each package 32.

The tubular member 36 has a longitudinal seam 44 establishing a thicker "fin" portion along the length of the tubular member 36 as a result of multiple film thicknesses in the fin portion. In a manner now well-known in the art of packaging, the continuous tubular member 36 is filled and then passed between a set of opposed crimping jaw assemblies 22 and 24, as the jaw assemblies 22 and 24 are rotated in the directions indicated by the arrows in FIG. 3, such that each set of crimping jaws 22 and 24 will establish a sealed closure 40 having a prescribed length 46 extending across the package 32 between opposite package edges 47. The circumferential spacing between the crimping jaw assemblies 22 and 24 located on each shaft 26 and 28 will space the sealed closures 40 along the tubular member 36 to establish the packages 32 as the tubular member 36 is advanced along a horizontal longitudinal path of travel 48 passing between the shafts 26 and 28. At the same time, the tubular member 36 is severed to form discrete packages 32 which are delivered at 49.

Each crimping jaw assembly 22 and 24 includes a crimping jaw carrier in the form of a base 50 which is affixed to a corresponding shaft 26 or 28, as by bolts 52, for rotation of the crimping jaw assemblies 22 and 24 with the corresponding shaft 26 or 28. The base 50 carries crimping jaws 54 each having a serrated face 56 for establishing each sealed closure 40. Rotation of the shafts 26 and 28, as described above, moves the crimping jaw assemblies 22 and 24 in crimping directions toward and away from one another to admit the tubular member 36 between the crimping jaw assemblies 22 and 24 of a set and then exert crimping forces on the tubular member 36 to form each sealed closure 40. Each crimping jaw 54 includes a jaw length having an extent at least as long as the prescribed length 46 of the sealed closure 40.

In the embodiment of the present invention illustrated in FIGS. 5 through 7, a base 60 of a crimping jaw assembly 62 carries crimping jaws 64 affixed to the base 60, as by bolts 66. The mounting arrangement enables selective removal of the crimping jaws 64 from the base 60 by operation of the bolts 66. In this manner, crimping jaws 64 may be replaced to allow for interchanging or for renewal, as desired. Each crimping jaw 64 has a jaw length 68 at least as long as the prescribed length 46 of the sealed closure 40 and includes a serrated crimping face 69 along the jaw length 68.

A cushion 70 of resilient material is interposed between each crimping jaw 64 and the base 60, the cushion 70 preferably having an overall area extending along a length which corresponds to at least the length 46 of the sealed closure 40. Cushion 70 tends to absorb any instantaneous peak pressures which could result from the crimping forces exerted by the crimping jaws 64, and tends to distribute the crimping forces more evenly over the length 46 of the sealed closure 40 so as to avoid any concentration of forces which could raise the pressure exerted upon the thin film material 34 to the degree where the material 34 will rupture, with a resulting failed closure. The illustrated crimping jaw assembly 62 is a lower assembly corresponding to lower crimping jaw assembly 24 and cushion 70 preferably includes a first layer 72 having a length 74 at least as long as the length 46 of the sealed closure 40, and a second layer 76 juxtaposed with and underlying the first layer 72. The second layer 76 has a length 78 less than the length 74 of the first layer 72 and is located beneath the crimping jaw 64 in the vicinity where the fin portion of the tubular member 36 is to be engaged by each crimping jaw member 64 of the upper crimping jaw assembly 62. The second layer 76 thus provides added thickness to the cushion 70 in that vicinity, establishing a cushioning area which is less than the overall area of the cushion 70 and enables the crimping jaws 64 to compensate for the added thickness of the fin portion without raising the pressure placed upon the material of the tubular member 36 by the crimping forces to a magnitude which could cause a failure at the closure 40. In the preferred arrangement, first and second layers 72 and 76 each are constructed of a sheet of elastomeric material, such as rubber, with the first layer 72 having a thickness of about one-thirty-second of an inch and the second layer 76 having a thickness of about one-sixteenth of an inch. The preferred material for the crimping jaws 64 is a synthetic polymeric material such as a composite of nylon and KEVLAR (aramid fiber), available commercially as HYDLAR.

In the embodiment of the present invention illustrated in FIGS. 8 through 10, a base 80 of a crimping jaw assembly 82 carries crimping jaws 84 affixed to the base 80, as by bolts 86. The mounting arrangement enables selective removal of the crimping jaws 84 from the base 80 by operation of the bolts 86. In this manner, crimping jaws 84 may be replaced to allow for interchanging or for renewal, as desired. Each crimping jaw 84 has a jaw length 88 at least as long as the prescribed length 46 of the sealed closure 40 and includes a serrated crimping face 89 along the jaw length 88. A spline 90 extends along each crimping jaw 84 and depends from the crimping jaw 84 to engage a complementary groove 92 in the base 80 for facilitating the appropriate location of crimping jaw 84 on base 80, thereby expediting replacement of the crimping jaws 84.

A cushion 100 of resilient material is interposed between each crimping jaw 84 and the base 80, the cushion 100 being placed within the groove 92 and preferably extending at least along the length 88 which corresponds to at least the length 46 of the sealed closure 40. Cushion 100 tends to absorb any instantaneous peak pressures which could result from the crimping forces exerted by the crimping jaws 84, and tends to distribute the crimping forces more evenly over the length 46 of the sealed closure 40 so as to avoid any concentration of forces which could raise the pressure exerted upon the thin film material 34 to the degree where the material 34 will rupture, with a resulting failed closure. The illustrated crimping jaw assembly 82 is a lower assembly corresponding to lower crimping jaw assembly 24 and cushion 100 preferably includes a first layer 102 having a length 104 at least as long as the length 46 of the sealed closure 40, and a second layer 106 juxtaposed with and overlying the first layer 102. The second layer 106 has a length 108 less than the length 104 of the first layer 102 and is located beneath the crimping jaw 84 in the vicinity where the fin portion of the tubular member 36 is to be engaged by the crimping jaw 84. The second layer 106 thus provides added thickness to the cushion 100 in that vicinity, establishing a cushioning area which enables the crimping jaws 84 to compensate for the added thickness of the fin portion without raising the pressure placed upon the material of the tubular member 36 by the crimping forces to a magnitude which could cause a failure at the sealed closure 40. In the preferred arrangement, first and second layers 102 and 106 each are constructed of a sheet of elastomeric material, such as rubber, with the first and second layers 102 and 106 both having a thickness of about one-thirty-second of an inch. The preferred material for the crimping jaws 84 is a synthetic polymeric material such as HYDLAR, which is a composite of nylon and KEVLAR.

The embodiments of FIGS. 5 through 10 are constructed for closing and sealing a cohesive closure, that is, a closure which is sealed with an adhesive and does not require heat in order to complete the seal. The embodiment of the present invention illustrated in FIGS. 11 through 13 is constructed for effecting a heat seal at the closure 40. To that end, a passage 110 is provided in base 112 of crimping jaw assembly 113 for the reception of a heater (not shown), in a now-conventional manner. Heat is transmitted to metallic crimping jaws 114 which are affixed to the base 112, as by brazing at areas 116. A cushion 120 of resilient material is interposed between each crimping jaw 114 and the base 112, the cushion 120 preferably extending at least along a length which corresponds to at least the length 46 of the sealed closure 40. Cushion 120 tends to absorb any instantaneous peak pressures which could result from the crimping forces exerted by the crimping jaws 114, and tends to distribute the crimping forces more evenly over the length 46 of the sealed closure 40 so as to avoid any concentration of forces which could raise the pressure exerted upon the thin film material 34 to the degree where the material 34 will rupture, with a resulting failed closure. The illustrated crimping jaw assembly 113 is a lower assembly corresponding to lower jaw assembly 24 and cushion 120 preferably includes a generally central portion 122 having an area in the vicinity where the fin portion of the tubular member 36 is to be engaged by the crimping jaw 114 greater than the area of end portions 124 of the cushion 120. The central portion 122 thus provides added area to the cushion 120 in that vicinity, establishing a cushioning area which enables the crimping jaws 114 to compensate for the added thickness of the fin portion without raising the pressure placed upon the material of the tubular member 36 by the crimping forces to a magnitude which could cause a failure at the closure 40. In the preferred arrangement, cushion 120 is constructed of a sheet of heat-conductive elastomeric material, such as a silicone rubber, with the cushion 120 having a thickness of about one-sixteenth of an inch. The preferred material for the crimping jaws 114 is a heat, corrosion and wear resistant metal alloy such as HASTELLOY.

Figure 14:
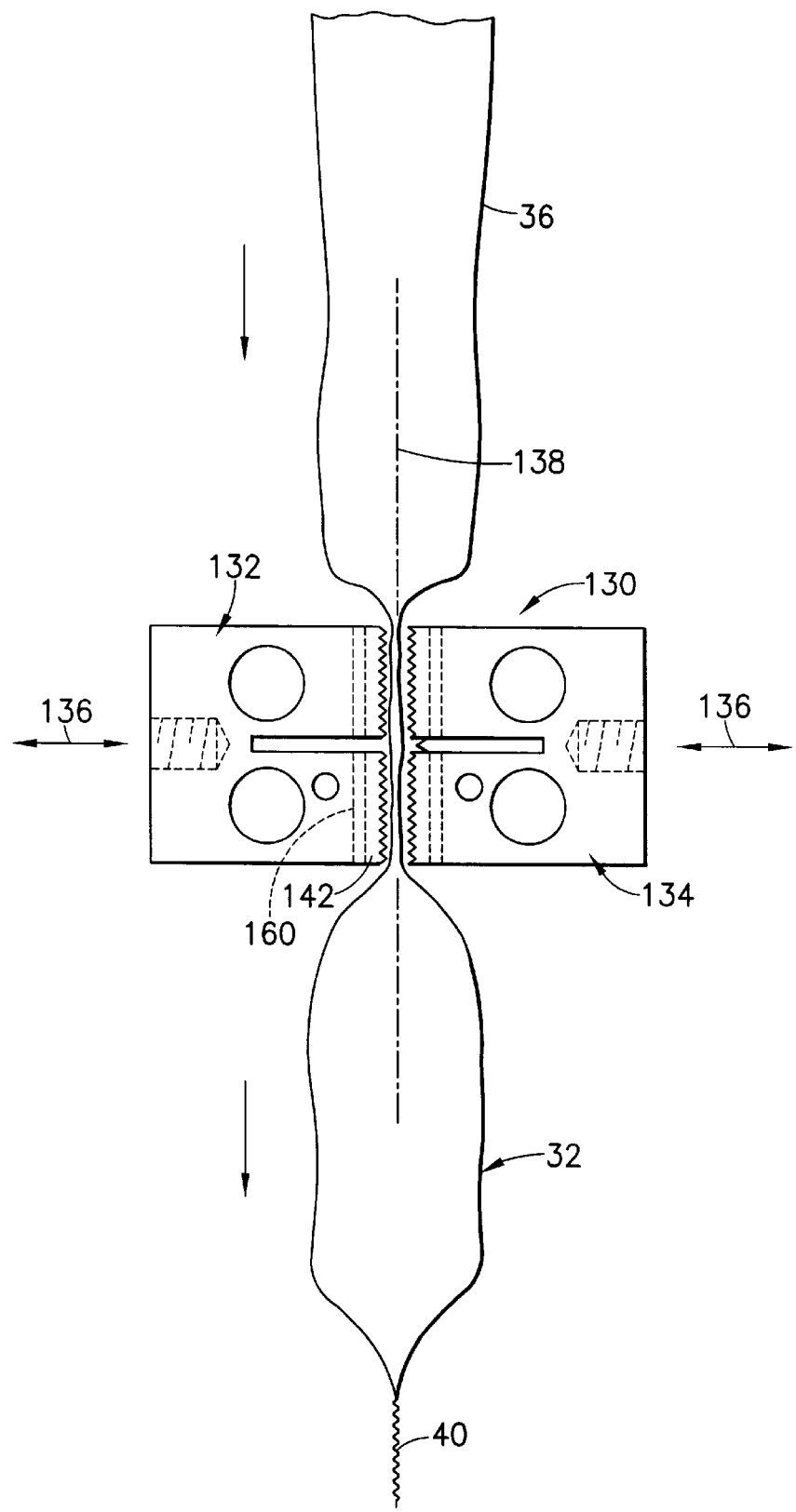
FIG. 14 is a front elevational view, partially diagrammatic, showing another package closure crimping apparatus with crimping jaw assemblies utilizing the improvement of the present invention.

Turning now to FIG. 14, an embodiment of the present invention is illustrated wherein a package closure crimping apparatus 130 includes a pair of opposed crimping jaw assemblies 132 and 134 mounted for linear reciprocating movement toward and away from one another, in directions indicated by the arrows 136. Tubular member 36 is advanced between the crimping jaw assemblies 132 and 134 along a vertical longitudinal path of travel 138 to effect sealed closures, such as sealed closure 40.

As best seen in FIGS. 15 through 17, as well as in FIG. 14, crimping jaw assembly 132 includes a base 140 which carries crimping jaws 142, and passages 144 are provided for the reception of heaters (not shown), as described above. In the present embodiment, the crimping jaws 142 are unitary with the base 140 and have a jaw length 146 at least as great as the length 46 of the sealed closure 40. Each crimping jaw 142 includes a serrated crimping face 148 along the jaw length 146. A slot 150 in the crimping jaw assembly 132 extends along the length 146 of the corresponding crimping jaw 142, adjacent the serrated crimping face 148, and has a length which preferably is at least as long as the length 46 of the sealed closure 40.

A cushion 160 of resilient material is interposed between each crimping jaw 142 and the base 140 by being inserted into a corresponding slot 150, the cushion 160 preferably extending at least along a length which corresponds to at least the length 46 of the sealed closure 40. Cushion 160 tends to absorb any instantaneous peak pressures which could result from the crimping forces exerted by the crimping jaws 142, and tends to distribute the crimping forces more evenly over the length 46 of the sealed closure 40 so as to avoid any concentration of forces which could raise the pressure exerted upon the thin film material 34 to the degree where the material 34 will rupture, with a resulting failed closure. The illustrated crimping jaw assembly 132 corresponds to the lower jaw assembly 24 and cushion 160 preferably includes a generally central portion 162 having an area in the vicinity where the fin portion of the tubular member 36 is to be engaged by the crimping jaw 142 greater than the area of end portions 164 of the cushion 160. The central portion 162 thus provides added area to the cushion 160 in that vicinity, establishing a cushioning area which enables the crimping jaws 142 to compensate for the added thickness of the fin portion without raising the pressure placed upon the material of the tubular member 36 by the crimping forces to a magnitude which could cause a failure at the closure 40. In the preferred arrangement, cushion 160 is constructed of a sheet of heat-conductive elastomeric material, such as a silicone rubber, with the cushion 160 having a thickness of about one-sixteenth of an inch. The preferred material for the crimping jaws 142 is a heat, corrosion and wear resistant metal alloy such as HASTELLOY.

It will be seen that the improvement of the present invention attains the several objects and advantages summarized above, namely: Attains a more even seal of desired uniform high integrity along the full length of a closure formed in a package constructed of thin film material; reduces wear along the crimping jaws of package closure apparatus and thereby increases accuracy and longevity; assures a more even distribution of crimping forces along the length of the crimping jaws of a crimping jaw assembly in package closure apparatus, with a concomitant reduction in deleterious wear and increased accuracy in the establishment of an appropriately sealed closure; compensates more readily for variations in material thickness along the length of a package closure, and especially at the multiple thicknesses of material encountered at the fin area of a package constructed of a tubular member of thin film material; increases the effectiveness of crimping jaws utilized in connection with both heat-sealed package closures and cohesive sealed package closures; provides package closure crimping jaw assemblies with exemplary performance over an extended service life.

It is to be understood that the above detailed description of preferred embodiments of the invention is provided by way of example only. Various details of design and construction may be modified without departing from the principles and scope of the invention, as set forth in the appended claims.

The embodiments of the invention in which an exclusive property or privilege is claimed are defined as follows:

1. An improvement in a package closure crimping apparatus in which opposed crimping jaws are moved toward and away from one another to exert crimping forces for forming a sealed closure in a package having opposite package edges and being constructed of thin film material having a given film thickness and placed between the crimping jaws, the sealed closures having a prescribed length extending from one to the other of the opposite package edges, the improvement comprising:

a crimping jaw carrier;

a crimping jaw carried by the crimping jaw carrier for movement with the crimping jaw carrier, the crimping jaw having a jaw length at least long enough for extending the crimping jaw across the entire prescribed length of the sealed closure, the crimping jaw including a serrated crimping face having a length at least long enough to extend across the crimping face along the entire prescribed length of the sealed closure;

a cushion of resilient material interposed between the crimping jaw and the crimping jaw carrier, the cushion having a cushion length extending along the jaw length, for juxtaposition with the prescribed length to facilitate distribution of the crimping forces along the jaw length of the crimping jaw; and wherein the package includes multiple film thickness at a predetermined location along a portion of the prescribed length between opposite package edges, and the cushion of resilient material has an overall area extending along the entire prescribed length and a cushioning area extending along a portion of the overall area, at least the cushioning area including cushioning material for providing sufficient cushioning at the predetermined location to compensate for the multiple film thickness.

2. The improvement of claim 1 wherein the crimping jaw is constructed of a synthetic polymeric material, and the resilient material of the cushion is an elastomeric material.

3. The improvement of claim 2 wherein the synthetic polymeric material is a composite of nylon and aramid fiber.

4. The improvement of claim 1 wherein the crimping jaw is constructed of a metal and the resilient material of the cushion is a heat-conductive elastomeric material.

5. The improvement of claim 4 wherein the heat-conductive elastomeric material is a silicone rubber.

6. The improvement of claim 1 wherein the cushion of resilient material has a thickness, and the thickness of the cushion along the cushioning area is greater than the thickness of the cushion along a further portion of the overall area located outside the cushioning area.

7. The improvement of claim 6 wherein the cushion includes a first layer of resilient material having a first thickness and a first length extending along the overall area of the cushion, and a second layer of resilient material Juxtaposed with the first layer and having a second thickness, the second layer extending along the cushioning area and having a second length less than the first length.

8. The improvement of claim 7 wherein the crimping jaw is constructed of a synthetic polymeric material, and the resilient material of the cushion is an elastomeric material.

9. The improvement of claim 8 wherein the synthetic polymeric material is a composite of nylon and aramid fiber.

10. The improvement of claim 1 including a mounting arrangement for mounting the crimping jaw on the crimping jaw carrier for selective removal of the crimping jaw from the crimping jaw carrier.

11. An improvement in a package closure crimping apparatus in which opposed crimping jaws are moved toward and away from one another to exert crimping forces for forming a sealed closure in a package having opposite package edges and being constructed of thin film material having a given film thickness and placed between the crimping jaws, the sealed closures having a prescribed length extending from one to the other of the opposite package edges, the improvement comprising:

opposed crimping jaw carriers for movement toward and away from one another;

a crimping jaw carried by each crimping jaw carrier for movement with the crimping jaw carrier, the crimping jaw having a jaw length at least long enough for extending the crimping jaw across the entire prescribed length of the sealed closure, the crimping jaw including a serrated crimping face having a length at least long enough to extend the crimping face across the entire prescribed length of the sealed closure;

a cushion of resilient material interposed between each crimping jaw and a corresponding crimping jaw carrier, the cushion having a cushion length extending along the jaw length, for juxtaposition with the prescribed length to facilitate distribution of the crimping forces along the jaw length of each crimping jaw; and wherein the package includes multiple film thickness at a predetermined location along a portion of the prescribed length between opposite package edges, and the cushion of resilient material has an overall area extending along the entire prescribed length and a cushioning area extending along a portion of the overall area, at least the cushioning area including cushioning material for providing sufficient cushioning at the predetermined location to compensate for the multiple film thickness.

12. The improvement of claim 11 wherein each crimping jaw is constructed of a synthetic polymeric material, and the resilient material of each cushion is an elastomeric material.

13. The improvement of claim 12 wherein the synthetic polymeric material is a composite of nylon and aramid fiber.

14. The improvement of claim 11 wherein each crimping jaw is constructed of a metal and the resilient material of each cushion is a heat-conductive elastomeric material.

15. The improvement of claim 14 wherein the heat-conductive elastomeric material is a silicone rubber.

16. The improvement of claim 11 wherein each cushion of resilient material has a thickness, and the thickness of the cushion along the cushioning area is greater than the thickness of the cushion along a further portion of the overall area located outside the cushioning area.

17. The improvement of claim 16 wherein each cushion includes a first layer of resilient material having a first thickness and a first length extending along the overall area of the cushion, and a second layer of resilient material juxtaposed with the first layer and having a second thickness, the second layer extending along the cushioning area and having a second length less than the first length.

18. The improvement of claim 11 including a mounting arrangement for mounting each crimping jaw on a corresponding crimping jaw carrier for selective removal of the crimping jaw from the crimping jaw carrier.

* * * * *